United States Patent
Wan

(10) Patent No.: US 11,569,675 B2
(45) Date of Patent: Jan. 31, 2023

(54) CHARGING DEVICE, TERMINAL, AND METHOD FOR CONTROLLING CHARGING

(71) Applicant: GUANGDONG OPPO MOBILE TELECOMMUNICATIONS CORP., LTD., Guangdong (CN)

(72) Inventor: Shiming Wan, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 279 days.

(21) Appl. No.: 17/025,512

(22) Filed: Sep. 18, 2020

(65) Prior Publication Data

US 2021/0006089 A1 Jan. 7, 2021

Related U.S. Application Data

(63) Continuation of application No. PCT/CN2018/092486, filed on Jun. 22, 2018.

(51) Int. Cl.
*H02J 7/04* (2006.01)
*H02J 50/80* (2016.01)
(Continued)

(52) U.S. Cl.
CPC .............. *H02J 7/04* (2013.01); *H02J 7/0013* (2013.01); *H02J 7/00032* (2020.01);
(Continued)

(58) Field of Classification Search
CPC ........ H02J 7/04; H02J 7/00032; H02J 7/0013; H02J 7/0047; H02J 50/80; H02J 50/10;
(Continued)

(56) References Cited

U.S. PATENT DOCUMENTS

| 9,583,965 B2 | 2/2017 | Park |
| 2008/0303479 A1 | 12/2008 | Park et al. |

(Continued)

FOREIGN PATENT DOCUMENTS

| CN | 104704704 | 6/2015 |
| CN | 105656115 | 6/2016 |

(Continued)

OTHER PUBLICATIONS

EPO, Extended Search Report of EP Application No. 18923249.9, dated Dec. 8, 2020.
(Continued)

*Primary Examiner* — Nghia M Doan
(74) *Attorney, Agent, or Firm* — Hodgson Russ LLP

(57) ABSTRACT

A charging device, a terminal, and a method for controlling charging are provided. The charging device includes a wireless receiving circuit, a charging interface, a charging management module, and a control module. The wireless receiving circuit is configured to convert a wireless charging signal received into charging electrical energy. The charging interface is configured to receive charging electrical energy supplied by an external power supply device. The charging management module is configured to adjust a voltage and/or current in the charging electrical energy output from the wireless receiving circuit or the charging interface. The control module is configured to control a first charging channel where the wireless receiving circuit and the charging management module are disposed to be switched on, and/or control a second charging channel where the charging interface and the charging management module are disposed to be switched on.

16 Claims, 4 Drawing Sheets

(51) Int. Cl.
*H02J 7/00* (2006.01)
*H02J 50/10* (2016.01)
(52) U.S. Cl.
CPC ............ *H02J 7/0047* (2013.01); *H02J 50/80* (2016.02); *H02J 50/10* (2016.02); *H02J 2207/20* (2020.01)
(58) Field of Classification Search
CPC ...... H02J 2207/20; H02J 2207/40; H02J 7/00; H04B 5/0037
See application file for complete search history.

(56) References Cited

U.S. PATENT DOCUMENTS

| | | | |
|---|---|---|---|
| 2013/0221913 | A1 | 8/2013 | Kim |
| 2014/0184171 | A1* | 7/2014 | Lee .................. H02J 50/10 320/138 |
| 2015/0207336 | A1 | 7/2015 | Morreale et al. |
| 2016/0218521 | A1 | 7/2016 | Huang et al. |
| 2017/0072807 | A1* | 3/2017 | Matsumoto ............. B60L 53/14 |
| 2017/0077743 | A1* | 3/2017 | Liu ...................... H02J 7/0029 |
| 2018/0138735 | A1* | 5/2018 | Maalouf ........... H02J 7/007182 |

FOREIGN PATENT DOCUMENTS

| | | |
|---|---|---|
| CN | 106537720 | 3/2017 |
| CN | 106549445 | 3/2017 |
| EP | 2472353 | 7/2012 |
| EP | 3133746 | 2/2017 |
| JP | 2009273327 | 11/2009 |
| JP | 2011239603 | 11/2011 |
| JP | 2015056959 | 3/2015 |
| KR | 20080032519 A | 4/2008 |
| KR | 20170022115 A | 3/2017 |

OTHER PUBLICATIONS

EPO, Communication for European Application No. 18923249.9, dated Nov. 4, 2021.
JPO, Office Action for JP Application No. 2020-557953, dated Dec. 10, 2021.
WIPO, ISR for PCT/CN2018/092486, dated Aug. 21, 2018.
EPO, Communication Pursuant to Article 94(3) EPC for EP 18923249.9, dated Jun. 1, 2022.
JPO, Office Action for JP 2020557953, dated May 10, 2022.
KIPO, Office Action for KR 10-2020-7030451, dated Jul. 27, 2022.
IPI, First examination for IN application No. 202027045716, dated Mar. 23, 2021.
IP Australia, Examination report No. 1 for AU application No. 2018429030, dated May 3, 2021.

* cited by examiner

CHARGING DEVICE, TERMINAL, AND METHOD FOR CONTROLLING CHARGING

CROSS-REFERENCE TO RELATED APPLICATION(S)

This application is a continuation of International Application No. PCT/CN2018/092486, filed on Jun. 22, 2018, the entire disclosure of which is incorporated herein by reference.

TECHNICAL FIELD

This disclosure relates to the field of charging technology, and in particular, to a charging device, a terminal, and a method for controlling charging.

BACKGROUND

With the development of charging technology, on the basis of supporting a wired charging function, many charging devices have been extended to have a wireless charging function.

SUMMARY

A charging device, a terminal, and a method for controlling charging are provided according to the present disclosure.

In a first aspect, a charging device is provided. The charging device includes a wireless receiving circuit, a charging interface, a charging management module, and a control module. The wireless receiving circuit is configured to convert a wireless charging signal received into charging electrical energy. The charging interface is configured to receive charging electrical energy supplied by an external power supply device. The charging management module is configured to adjust a voltage and/or current in the charging electrical energy output from the wireless receiving circuit or the charging interface. The control module is configured to control a first charging channel where the wireless receiving circuit and the charging management module are disposed to be switched on, and/or control a second charging channel where the charging interface and the charging management module are disposed to be switched on.

In a second aspect, a terminal is provided. The terminal includes the charging device as described in the first aspect and a battery configured to be charged by the charging device.

In a third aspect, a method for controlling charging is provided. The method includes the following. Convert, with a wireless receiving circuit, a wireless charging signal received into charging electrical energy. Receive, with a charging interface, charging electrical energy supplied by an external power supply device. Control a first charging channel where the wireless receiving circuit and the charging management module are disposed to be switched on, and/or control a second charging channel where the charging interface and the charging management module are disposed to be switched on, where the charging management module is configured to adjust a voltage and/or current in the charging electrical energy output from the wireless receiving circuit or the charging interface.

DETAILED DESCRIPTION

Figure 1:
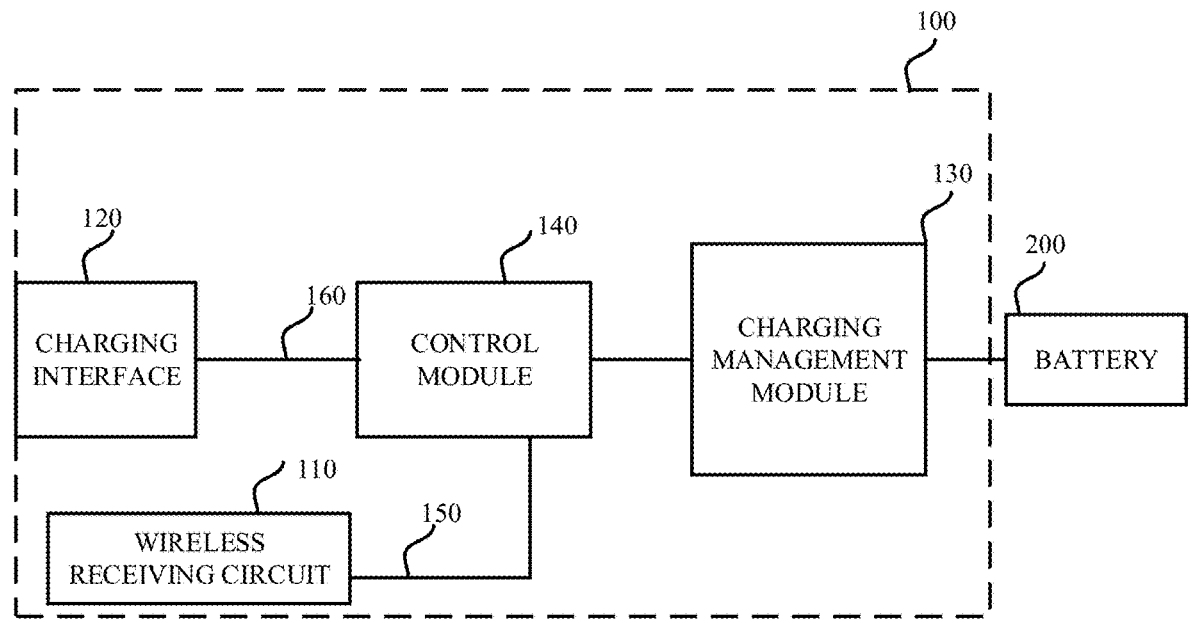
FIG. 1 is a schematic structural diagram illustrating a charging device according to an embodiment of the present disclosure.

The following will describe a charging device 100 provided in an embodiment of the present disclosure in detail with reference to FIG. 1.

As illustrated in FIG. 1, the charging device 100 includes a wireless receiving circuit 110, a charging interface 120, and a charging management module 130.

The wireless receiving circuit 110 (also known as wireless RX) is configured to convert a wireless charging signal received into charging electrical energy (also known as charging power and may include a charging voltage and a charging current). For example, the wireless receiving circuit 110 may receive, with a receive coil or receive antenna (not illustrated in the figures), the wireless charging signal to obtain an alternating current, and conduct, with a shaping circuit (for example, a rectifier circuit and/or a filter circuit) in the wireless receiving circuit 110, an operation such as a rectification and/or filtering operation on the alternating current output from the receive coil, so as to convert the alternating current into the charging electrical energy suitable for charging.

The charging interface 120 (also known as a wired charging interface 120) is configured to receive charging electrical energy supplied by an external power source device. In the embodiment of the present disclosure, there is no detailed limitation on the type of the charging interface 120. For example, the charging interface 120 may be a universal serial bus (USB) interface or a lightning interface. The USB interface may be a standard USB interface, a micro USB interface, or a Type-C interface. In some embodiments, the charging interface 120 may be an interface circuit that is configured to receive external charging electrical energy. For example, the interface circuit may include a power line.

The charging management module 130 is configured to adjust a voltage and/or current in the charging electrical energy output from the wireless receiving circuit 110 or the charging interface 120. For example, the charging management module 130 can adjust the voltage and/or current in the charging electrical energy output from the wireless receiving circuit 110 or the charging interface 120 to make a voltage and current input to a battery 200 satisfy a charging requirement for the battery 200. In some embodiments, the charging management module 130 adjusting the voltage and/or current in the charging electrical energy output from the wireless receiving circuit 110 or the charging interface 120 can be replaced with the following. The charging management module 130 is configured to conduct charging management on a charging process of the battery 200. In some embodiments, the charging management module 130 adjusting the voltage and/or current in the charging electrical energy output from the wireless receiving circuit 110 or the charging interface 120 can be replaced with the following. The charging management module 130 is configured to conduct a constant-current and/or constant-voltage control on the charging process of the battery 200. The charging management module 130 may be, for example, a charging integrated circuit (IC) or called a charger.

The wireless receiving circuit 110 and the charging management module 130 are disposed on a first charging channel 150. Sometimes, the first charging channel 150 may also be referred to as a wireless charging channel. The first charging channel 150 may start from the wireless receiving circuit 110 and end with the battery 200. The first charging channel 150 can charge the battery 200 with the charging electrical energy output from the wireless receiving circuit 110.

Figure 2:
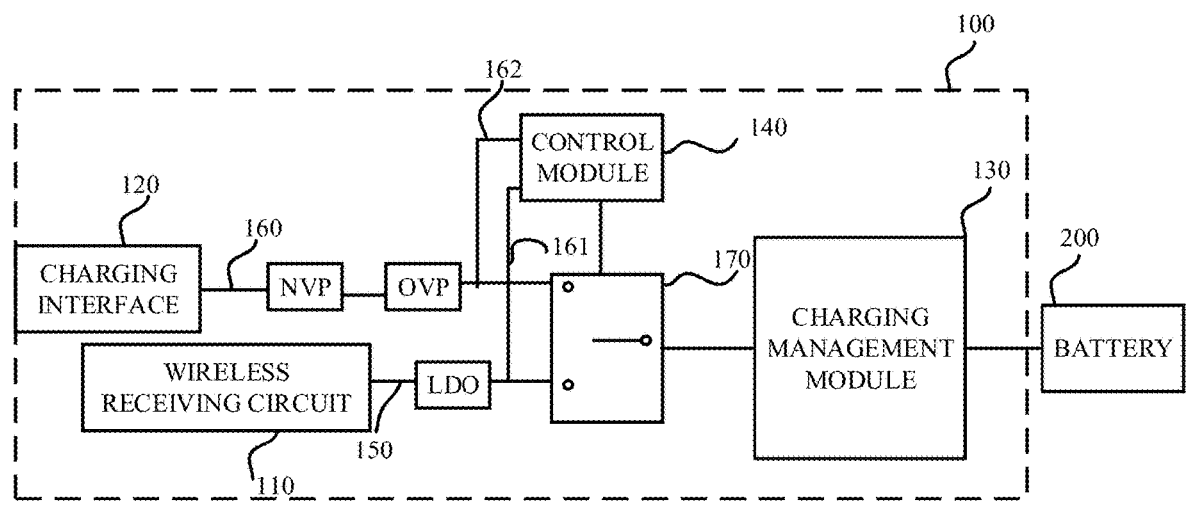
FIG. 2 is a schematic structural diagram illustrating a charging device according to another embodiment of the present disclosure.

It is to be understood that in addition to the charging management module 130, other types of functional circuits can be further disposed on the first charging channel 150 according to actual needs, and there is no limitation in the embodiments of the present disclosure. For example, a voltage-stabilizer circuit may be disposed on the first charging channel 150. For example, as illustrated in FIG. 2, the voltage-stabilizer circuit may be a low dropout regulator (LDO).

The charging interface 120 and the charging management module 130 are disposed on the second charging channel 160. Sometimes, the second charging channel 160 may be referred to as a wired charging channel. The second charging channel 160 may start from the charging interface 120 and end with the battery 200. The second charging channel 160 can charge the battery 200 with the charging electrical energy output from the charging interface 120.

It is to be understood that, in addition to the charging management module 130, other types of functional circuits can be further disposed on the second charging channel 160 according to actual needs, and there is no limitation in the embodiments of the present disclosure. For example, a voltage and/or current protection circuit can be further disposed on the second charging channel 160. For example, as illustrated in FIG. 2, a negative voltage protection (NVP) circuit and/or an over voltage protection (OVP) circuit and the like may be disposed on the second charging channel 160.

It can be seen from FIG. 1 that in the charging device 100, the first charging channel 150 and the second charging channel 160 share the same charging management module 130, which can simplify a structure of the charging device 100 and reduce the cost of the charging device 100.

In some embodiments, the charging device 100 further includes a control module 140. The control module 140 is configured to control the first charging channel 150 and/or the second charging channel 160 to be switched on or switched off.

The control module 140 may be a microcontroller unit (MCU) for example. When the charging device 100 is integrated in a terminal device (for example, a mobile phone) having an application processor (AP), the control module 140 may be the AP.

The control module 140 may control the first charging channel 150 and the second charging channel 160 in various manners. For example, the control module 140 can determine whether to enable the first charging channel 150 or the second charging channel 160 in response to a command input by a user, and can also determine whether to enable the first charging channel 150 or the second charging channel 160 by determining whether the first charging channel 150 or the second charging channel 160 receives an external charging signal. In addition, in some embodiments, the two charging channels are not selected by the control module 140 to work simultaneously. In other embodiments, the control module 140 may control the first charging channel 150 and the second charging channel 160 to work simultaneously.

In an embodiment, the control module 140 can control the first charging channel 150 to be switched on when it is detected that the wireless receiving circuit 110 receives the wireless charging signal, and control the second charging channel 160 to be switched on when it is detected that the charging interface 120 receives the charging electrical energy supplied by the external power source supply.

The control module 140 can directly control the first charging channel 150 and the second charging channel 160. In other embodiments, the control module 140 can indirectly control the first charging channel 150 and the second charging channel 160. For example, as illustrated in FIG. 2, the control module 140 controls the first charging channel 150 and the second charging channel 160 via a selection switch 170. The following will illustrate this embodiment with reference to FIG. 2.

As illustrated in FIG. 2, the charging device 100 may include a first detection line 161 and a second detection line 162. The first detection line 161 may be coupled with the first charging channel 150, and the second detection line 162 may be coupled with the second charging channel 160. When the wireless receiving circuit 110 receives the wireless charging signal, the control module 140 can detect, with the first detection line 161, that a voltage signal is applied to the first charging channel 150 and control, with the selection switch 170, the first charging channel 150 to work. Similarly, when the external power supply device outputs the charging electrical energy via the charging interface 120, the control module 140 can detect, with the second detection line 162, that a voltage signal is applied to the second charging channel 160 and control, with the selection switch 170, the second charging channel 160 to work. The voltage signal detected by the control module 140 may be a voltage signal after being subjected to current limiting with a resistor and level matching.

The selection switch 170 may be coupled in series on the first charging channel 150 and the second charging channel 160. As illustrated in FIG. 2, the selection switch 170 is coupled in series before the charging management module 130, but the embodiment of the present disclosure is not limited to this. In another embodiment, the selection switch 170 may be coupled in series between the charging management module 130 and the battery 200.

In the embodiment of the present disclosure, there is no detailed limitation on the type of the selection switch 170. The selection switch 170 may be a single-pole double-throw switch as illustrated in FIG. 2 or a switch chip with a selection function. The single-pole double-throw switch has advantages of simple structure and control.

Figure 3:
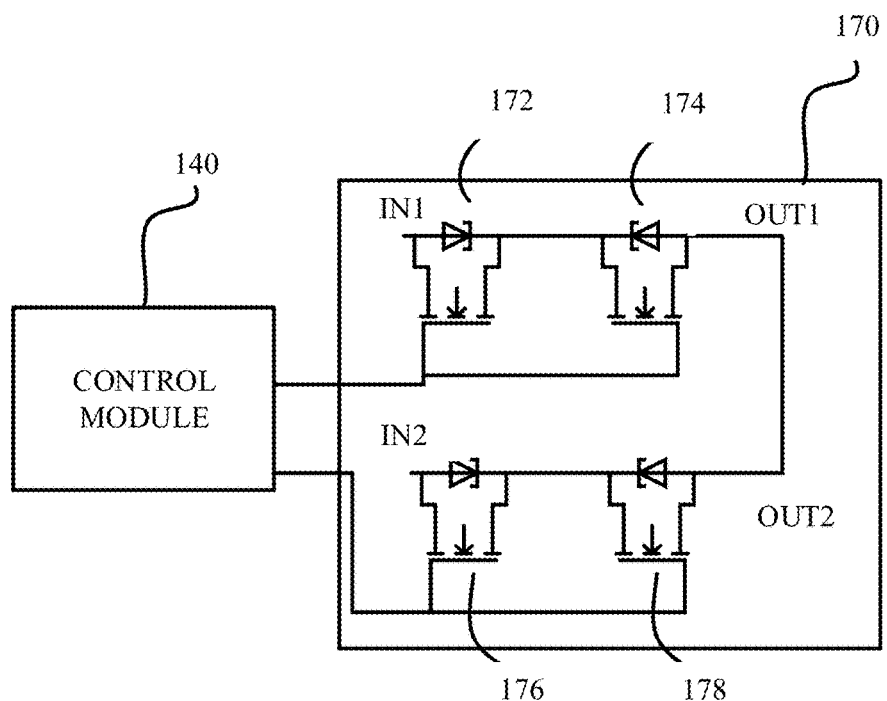
FIG. 3 is a diagram illustrating a detailed embodiment of a selection switch illustrated in FIG. 2.

The single-pole double-throw switch may be implemented in various manners. For example, the single-pole double-throw may be realized with multiple metal oxide semiconductor (MOS) transistors. As illustrated in FIG. 3, MOS transistors 172 and 174 may be coupled in series on the first charging channel 150, such that a line between IN1 and OUT1 acts as part of the first charging channel 150. The control module 140 may be coupled with control terminals of the MOS transistors 172 and 174 to control the MOS transistors 172 and 174 to be switched on or switched off simultaneously, such that the first charging channel 150 can be controlled to work or not work. Similarly, MOS transistors 176 and 178 may be coupled in series on the second charging channel 160, such that a line between IN2 and OUT2 acts as part of the second charging channel 160. The control module 140 may be coupled with control terminals of the MOS transistors 176 and 178 to control the MOS transistors 176 and 178 to be switched on or switched off simultaneously, such that the second charging channel 160 can be controlled to work or not work.

For another example, the single-pole double-throw switch may be realized with a load switch. The load switch may be, for example, a load switch with an anti-backflow function.

The battery 200 mentioned above may include a single cell or may include multiple cells coupled in series. In other words, the charging device 100 provided in the embodiment of the present disclosure can charge a single cell or multiple cells coupled in series.

It can be understood that the type of the charging management module 130 can be selected according to actual needs. For example, a step-down charging integrated circuit (IC) (for example, a Buck charger) or a step-up charging IC may be selected as the charging management module 130. In other embodiments, a charging IC with a step-up function and a step-down function (for example, a Buck-Boost charger) may be selected as the charging management module 130.

For example, if the voltage in the charging electrical energy output from the wireless receiving circuit 110 and the voltage in the charging electrical energy output from the charging interface 120 are always higher than a maximum charging voltage for charging the battery 200, the step-down charging IC can be configured as the charging management module 130.

For example, the charging device 100 can adopt a standard wireless charging protocol (for example, Qi Baseline Power Profile (Qi-BPP) protocol) to conduct wireless charging signal transmission with a wireless transmitting device. The voltage in the charging electrical energy output from the wireless receiving circuit 110 is 5V. Also, the charging device 100 can adopt a standard USB charging protocol to obtain a charging signal from the power supply device, where the voltage in the charging electrical energy output from the USB interface is also 5V. The battery 200 merely includes a single cell, where the maximum charging voltage required by the cell is lower than 5V (for example, may be 4.24V). Under this condition, since the voltage in the charging electrical energy output from the wireless receiving circuit 110 and the voltage in the charging electrical energy output from the charging interface 120 are always higher than the charging voltage required by the battery 200, the step-down charging IC can be selected as the charging management module 130.

For another example, the voltage in the charging electrical energy output from the charging interface 120 or the wireless receiving circuit 110 may be higher or lower than the charging voltage required by the battery 200. When the charging voltage required by the battery 200 is higher than the voltage in the charging electrical energy output from the charging interface 120 or the wireless receiving circuit 110, the step-up charging IC can be configured as the charging management module 130.

For example, when the battery 200 includes the multiple cells coupled in series, a charging voltage requirement for the battery 200 can be satisfied via the boost of the charging management module 130.

For yet another example, the charging device 100 adopts a high-voltage transmission mode to conduct wireless charging signal transmission with the wireless transmitting device, where the voltage in the charging electrical energy output from the wireless receiving circuit 110 is 20V. In addition, the charging device 100 adopts the standard USB charging protocol to obtain a charging signal from the power supply device, where the voltage in the charging electrical energy output from the USB interface is 5V. The battery 200 includes two cells coupled in series, where the charging voltage required by the two cells ranges from 6V to 8V. Under this condition, since the voltage in the charging electrical energy output from the wireless receiving circuit 110 is always higher than the charging voltage required by the battery 200 and the voltage in the charging electrical energy output from the charging interface 120 is always lower than the charging voltage required by the battery 200, the charging IC with the step-up and step-down function can be selected as the charging management module 130. When the first charging channel 150 works, the charging management module 130 performs the step-down function. When the second charging channel 160 works, the charging management module 130 performs the step-up function.

Figure 4:
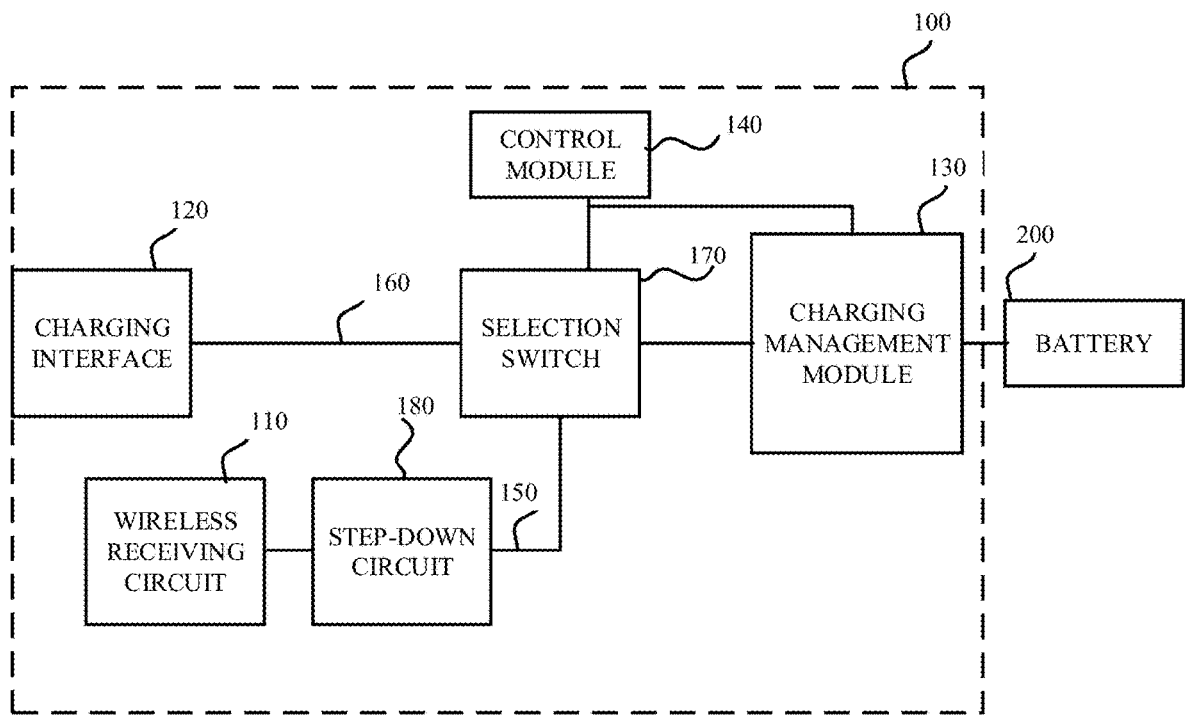
FIG. 4 is a schematic structural diagram illustrating a charging device according to yet another embodiment of the present disclosure.

In an embodiment, as illustrated in FIG. 4, a step-down circuit 180 may be disposed on the first charging channel 150. The step-down circuit 180 can be configured to step down the voltage on the first charging channel 150.

By disposing the step-down circuit 180 in the charging device 100, the wireless charging signal transmission can be conducted between the wireless transmitting device and the charging device in the high-voltage transmission manner, which is beneficial for reducing the current at the wireless receiving circuit 110, thereby reducing heat generation of the charging device 100.

The step-down circuit 180 may have a higher step-down conversion efficiency (or a power conversion efficiency) than the charging management module 130. For example, the step-down circuit 180 may be a charge pump.

Figure 5:
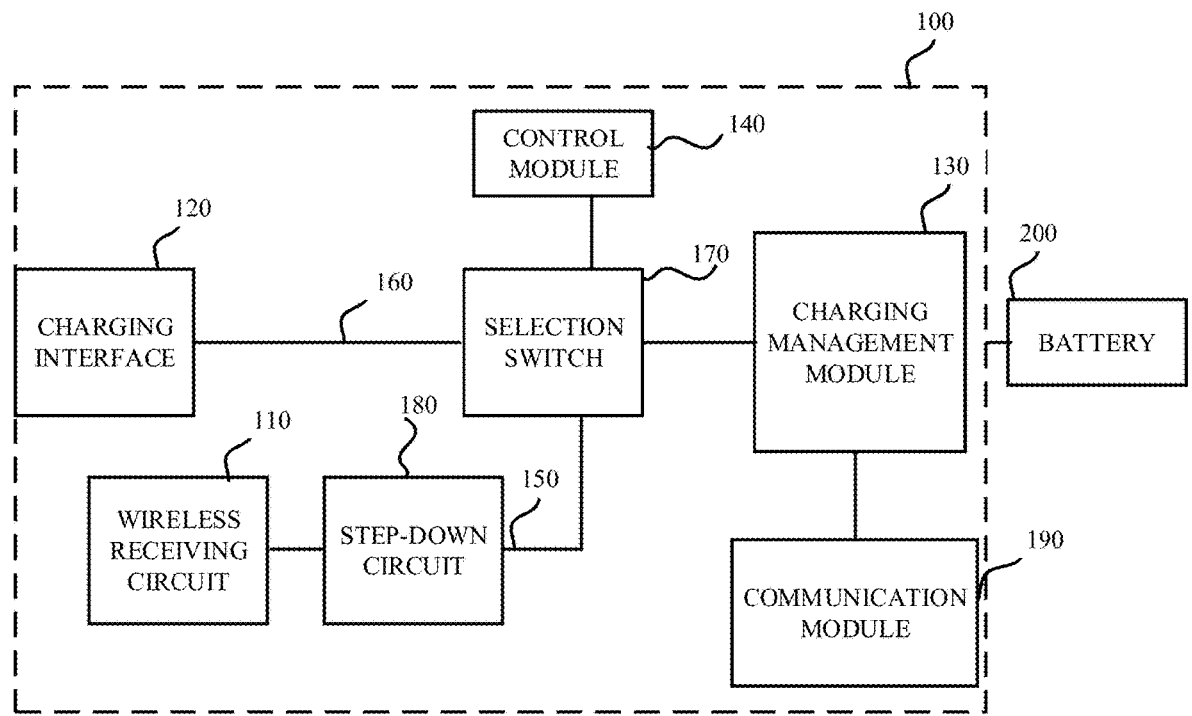
FIG. 5 is a schematic structural diagram illustrating a charging device according to yet another embodiment of the present disclosure.

In addition, as illustrated in FIG. 5, to further reduce the heat generated during the charging process, the charging device 100 may further include a communication module 190 configured to communicate with the wireless transmitting device (for example, a wireless charging base, not illustrated in the figures) wirelessly according to a voltage difference between an input voltage and output voltage of the charging management module 130, so as to direct the wireless transmitting device to adjust the wireless charging signal to decrease the voltage difference.

As illustrated in FIG. 5, the communication module 190 and the control module 140 are separately disposed, but there is no limitation in the embodiment of the present disclosure. In an embodiment, the communication module 190 and the control module 140 may be integrated together to form a communication control module.

The voltage difference between the input voltage and output voltage of the charging management module 130 may be measured in various manners. For example, the communication module 190 can detect voltages at an input terminal and output terminal of the charging management module 130 to measure the voltage difference between the input voltage and output voltage of the charging management module 130.For another example, the charging management module 130 can actively report the voltage difference between the input voltage and output voltage of the charging management module 130 to the communication module 190.

The step-down conversion efficiency of the charging management module 130 is positively correlated with the voltage difference between the input voltage and output voltage of the charging management module 130. The step-down conversion efficiency of the charging management module 130 can be increased by decreasing the voltage difference, thereby further reducing the heat generation of the charging device 100.

In some embodiments, the communication module 190 can transmit, according to a status of the battery 200 (for example, the voltage and/or remaining capacity of the battery 200), feedback information to the wireless transmitting device when the first charging channel 150 works, so as to direct the wireless transmitting device to adjust transmit power of the wireless charging signal to make the transmit power of the wireless charging signal match with a charging voltage and/or charging current currently required by the battery 200.

In other words, the communication module 190 in the charging device 100 can communicate with the wireless transmitting device with adjustable transmit power and timely adjust the transmit power of the wireless transmitting device according to the status of the battery 200. For example, the feedback information transmitted to the wireless transmitting device by the communication module 190 may be indicative of the voltage and/or remaining capacity of the battery 200 or used to direct the wireless transmitting device to increase or reduce the transmit power of the wireless charging signal.

In the embodiment of the present disclosure, there is no limitation on the wireless communication manner between the communication module 190 and the wireless transmitting device. For example, the communication module 190 and the wireless transmitting device may wirelessly communicate with each other in Bluetooth, wireless fidelity (Wi-Fi) or backscatter modulation manner (or a power load modulation manner).

Figure 6:
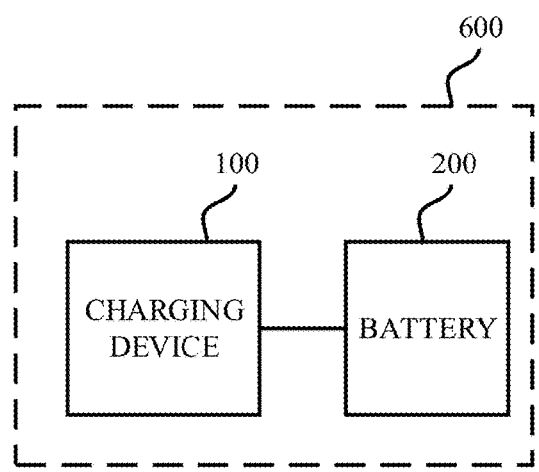
FIG. 6 is a schematic structural diagram illustrating a terminal according to an embodiment of the present disclosure.

As illustrated in FIG. 6, a terminal 100 is further provided in an embodiment of the present disclosure. The terminal 600 includes the charging device 100 described in any of the above embodiments and the battery 200.

The above describes the device embodiments of the present disclosure in detail with reference to FIGS. 1-6. The following will describe the method embodiment of the present disclosure in detail with reference to FIG. 7. It is to be understood that the description of the method embodiment corresponds to the description of the device embodiments, and thus for parts not described in detail, reference may be made to the device embodiments described above.

Figure 7:
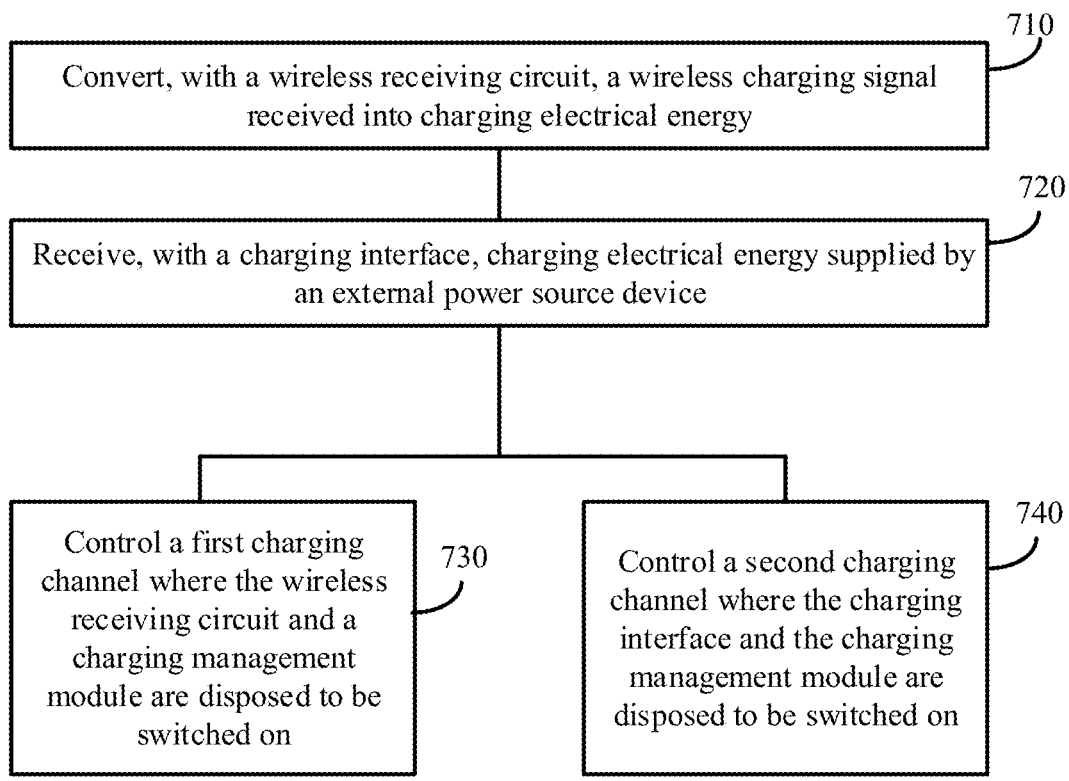
FIG. 7 is a schematic flow chart illustrating a method for controlling charging according to an embodiment of the present disclosure.

FIG. 7 is a schematic flow chart illustrating a method for controlling charging according to an embodiment of the present disclosure. The method illustrated in FIG. 7 can be executed by the charging device 100 described above and can also be executed by the terminal 600 described above. The method illustrated in FIG. 7 includes operations at blocks 710-740. The following will describe each operation in FIG. 7 in detail.

At block 710, convert, with a wireless receiving circuit, a wireless charging signal received into charging electrical energy.

At block 720, receive, with a charging interface, charging electrical energy supplied by an external power source device.

At block 730, control a first charging channel where the wireless receiving circuit and the charging management module are disposed to be switched on, and/or at block 740, control a second charging channel where the charging interface and the charging management module are disposed to be switched on, where the charging management module is configured to adjust a voltage and/or current in the charging electrical energy output from the wireless receiving circuit or the charging interface.

In an embodiment, the first charging channel is controlled to be switched on when the wireless charging signal is received, and the second charging channel is controlled to be switched on when the charging electrical energy supplied by the external power source device is received.

In an embodiment, the charging management module is a step-down charging IC or a step-up charging IC.

In an embodiment, when the voltage output from the wireless receiving circuit is higher than a charging voltage currently required by a battery, the charging management module is configured to step down a voltage on the first charging channel to make an output voltage of the first charging channel match with the charging voltage currently required by the battery.

In an embodiment, a step-down circuit is further disposed on the first charging channel. The step-down circuit is configured to step down the voltage on the first charging channel.

In an embodiment, the step-down circuit has a higher step-down conversion efficiency than the charging management module.

In an embodiment, the step-down circuit is a charge pump.

In an embodiment, the method illustrated in FIG. 7 further includes the following. When the first charging channel works, according to a voltage difference between an input voltage and output voltage of the charging management module, communicate with a wireless transmitting device wirelessly to direct the wireless transmitting device to adjust the wireless charging signal, so as to decrease the voltage difference.

In an embodiment, the method in FIG. 7 further includes the following. When the first charging channel works, according to a status of the battery, transmit feedback information to the wireless transmitting device to direct the wireless transmitting device to adjust transmit power of the wireless charging signal, so as to make the transmit power of the wireless charging signal match with the charging voltage and/or a charging current currently required by the battery.

In an embodiment, the voltage output from the charging interface is lower than the charging voltage currently required by the battery. The charging management module is configured to step up a voltage on the second charging channel to make an output voltage of the second charging channel match with the charging voltage currently required by the battery.

In an embodiment, the battery includes a single cell or multiple cells couple in series.

A person of ordinary skill in the art may appreciate that the units and algorithm steps in the examples described in combination with the embodiments disclosed herein can be implemented by electronic hardware or a combination of computer software and electronic hardware. Whether these functions are performed by hardware or software depends on specific application and design constraint conditions of the technical solution. Professionals and technicians can use different methods for each specific application to implement the described functions, but such embodiment should not be considered beyond the scope of the present disclosure.

In the several embodiments provided in the present disclosure, it should be understood that the disclosed system, device, and method may be implemented in other manners. For example, the device embodiments described above are merely illustrative. For example, the unit division is only a logical function division, and there may be other divisions in actual embodiment, for example, multiple units or components may be combined or integrated into another system, or some features can be ignored or not performed. In addition, mutual coupling or direct coupling or communication connection displayed or discussed may be indirect coupling or communication connection through some interfaces, devices, or units, and may be in electrical form, mechanical form, or other forms.

The units described as separate components may or may not be physically separated, and the components displayed as units may or may not be physical units, that is, they may be located in one place, or they may be distributed on multiple network units. Some of or all the units may be selected according to actual needs to achieve the technical solutions of the embodiments.

In addition, the functional units in the various embodiments of the present disclosure may be integrated into one processing unit, or each unit may exist alone physically, or two or more units may be integrated into one unit.

The above are only specific embodiments of the present disclosure, but the protection scope of the present disclosure is not limited thereto. Any person skilled in the art can easily think of changes or substitutions within the technical scope disclosed in the present disclosure, and these changes or substitutions shall fall in the protection scope of the present disclosure. Therefore, the protection scope of the present disclosure shall be subject to the protection scope of the claims.

What is claimed is:

1. A charging device configured to charge a battery and comprising:
   a wireless receiving circuit configured to convert a wireless charging signal received into charging electrical energy, wherein the wireless receiving circuit is configured to adopt a high-voltage transmission mode to conduct wireless charging signal transmission with a wireless transmitting device, such that a voltage in the charging electrical energy output from the wireless receiving circuit is always higher than a charging voltage required by the battery;
   a charging interface configured to receive charging electrical energy supplied by an external power source device, wherein the charging interface is configured to adopt a standard universal serial bus (USB) charging protocol to receive the charging electrical energy, such that a voltage in the charging electrical energy output from the charging interface is always lower than the charging voltage required by the battery;
   a charging management module configured to adjust a voltage or current in the charging electrical energy output from the wireless receiving circuit or the charging interface, the charging management module being a charging integrated circuit with a step-up and step-down function; and
   a control module configured to control a first charging channel where the wireless receiving circuit and the charging management module are disposed to be switched on, and control a second charging channel where the charging interface and the charging management module are disposed to be switched on, wherein when the first charging channel works, the charging management module performs the step-down function, and when the second charging channel works, the charging management module performs the step-up function.

2. The charging device of claim 1, further comprising a step-down circuit disposed on the first charging channel, wherein the step-down circuit is configured to step down a voltage on the first charging channel to make an output voltage of the first charging channel match with the charging voltage currently required by the battery.

3. The charging device of claim 2, wherein the step-down circuit has a higher step-down conversion efficiency than the charging management module.

4. The charging device of claim 2, wherein the step-down circuit is a charge pump.

5. The charging device of claim 1, further comprising a communication module configured to communicate, according to a voltage difference between an input voltage and output voltage of the charging management module, with the wireless transmitting device wirelessly when the first charging channel works, so as to direct the wireless transmitting device to adjust the wireless charging signal to decrease the voltage difference.

6. The charging device of claim 1, further comprising a communication module configured to transmit, according to a status of the battery, feedback information to the wireless transmitting device when the first charging channel works, so as to direct the wireless transmitting device to adjust transmit power of the wireless charging signal to make the transmit power of the wireless charging signal match with a charging voltage or charging current currently required by the battery.

7. The charging device of claim 1, wherein the control module is configured to control the first charging channel to be switched on when the wireless receiving circuit receives the wireless charging signal and control the second charging channel to be switched on when the charging interface receives the charging electrical energy supplied by the external power source device.

8. The charging device of claim 7, further comprising:
   a first detection line coupled with the first charging channel; and
   a second detection line coupled with the second charging channel;
   wherein the control module is configured to determine that the wireless receiving circuit receives the wireless charging signal when the control module detects, with the first detection line, that a voltage signal is applied to the first charging channel, and determine that the charging interface receives the charging electrical energy supplied by the external power source device when the control module detects, with the second detection line, that another voltage signal is applied to the second charging channel.

9. The charging device of claim 1, further comprising a selection switch coupled with the control module, wherein the control module is configured to control the first charging channel and the second charging channel via the selection switch.

10. The charging device of claim 1, wherein the battery comprises a single cell or a plurality of cells coupled in series.

11. A terminal comprising:
    a battery; and
    a charging device comprising:
    a wireless receiving circuit configured to convert a wireless charging signal received into charging electrical energy, wherein the wireless receiving circuit is configured to adopt a high-voltage transmission mode to conduct wireless charging signal transmission with a wireless transmitting device, such that a voltage in the charging electrical energy output from the wireless receiving circuit is always higher than a charging voltage required by the battery;

a charging interface configured to receive charging electrical energy supplied by an external power source device, wherein the charging interface is configured to adopt a standard universal serial bus (USB) charging protocol to receive the charging electrical energy, such that a voltage in the charging electrical energy output from the charging interface is always lower than the charging voltage required by the battery;

a charging management module configured to adjust a voltage or current in the charging electrical energy output from the wireless receiving circuit or the charging interface, the charging management module being a charging integrated circuit with a step-up and step-down function; and a control module configured to control a first charging channel where the wireless receiving circuit and the charging management module are disposed to be switched on, and control a second charging channel where the charging interface and the charging management module are disposed to be switched on, wherein when the first charging channel works, the charging management module performs the step-down function, and when the second charging channel works, the charging management module performs the step-up function.

12. The terminal of claim 11, wherein the control module is configured to control the first charging channel to be switched on when the wireless receiving circuit receives the wireless charging signal and control the second charging channel to be switched on when the charging interface receives the charging electrical energy supplied by the external power source device.

13. A method for charging a battery, comprising:
converting, with a wireless receiving circuit, a wireless charging signal received into charging electrical energy, wherein the wireless receiving circuit is configured to adopt a high-voltage transmission mode to conduct wireless charging signal transmission with a wireless transmitting device, such that a voltage in the charging electrical energy output from the wireless receiving circuit is always higher than a charging voltage required by the battery;

receiving, with a charging interface, charging electrical energy supplied by an external power supply device, wherein the charging interface is configured to adopt a standard universal serial bus (USB) charging protocol to receive the charging electrical energy, such that a voltage in the charging electrical energy output from the charging interface is always lower than the charging voltage required by the battery; and controlling a first charging channel where the wireless receiving circuit and a charging management module are disposed to be switched on, and controlling a second charging channel where the charging interface and the charging management module are disposed to be switched on, wherein the charging management module is configured to adjust a voltage or current in the charging electrical energy output from the wireless receiving circuit or the charging interface, and the charging management module is a charging integrated circuit with a step-up and step-down function, and wherein when the first charging channel works, the charging management module performs the step-down function, and when the second charging channel works, the charging management module performs the step-up function.

14. The method of claim 13, further comprising:
controlling the first charging channel to be switched on when the wireless charging signal is received; and
controlling the second charging channel to be switched on when the charging electrical energy supplied by the external power supply device is received.

15. The method of claim 13, further comprising:
communicating, according to a voltage difference between an input voltage and output voltage of the charging management module, with wireless transmitting device wirelessly when the first charging channel works, so as to direct the wireless transmitting device to adjust the wireless charging signal to decrease the voltage difference.

16. The method of claim 13, further comprising:
transmitting, according to a status of the battery, feedback information to the wireless transmitting device when the first charging channel works, so as to direct the wireless transmitting device to adjust transmit power of the wireless charging signal to make the transmit power of the wireless charging signal match with a charging voltage or charging current currently required by the battery.

* * * * *